Dec. 23, 1930.      P. WADE      1,785,923
STRAIN APPLYING DEVICE FOR METALLIC MATERIAL
Filed Nov. 1. 1929      2 Sheets-Sheet 1
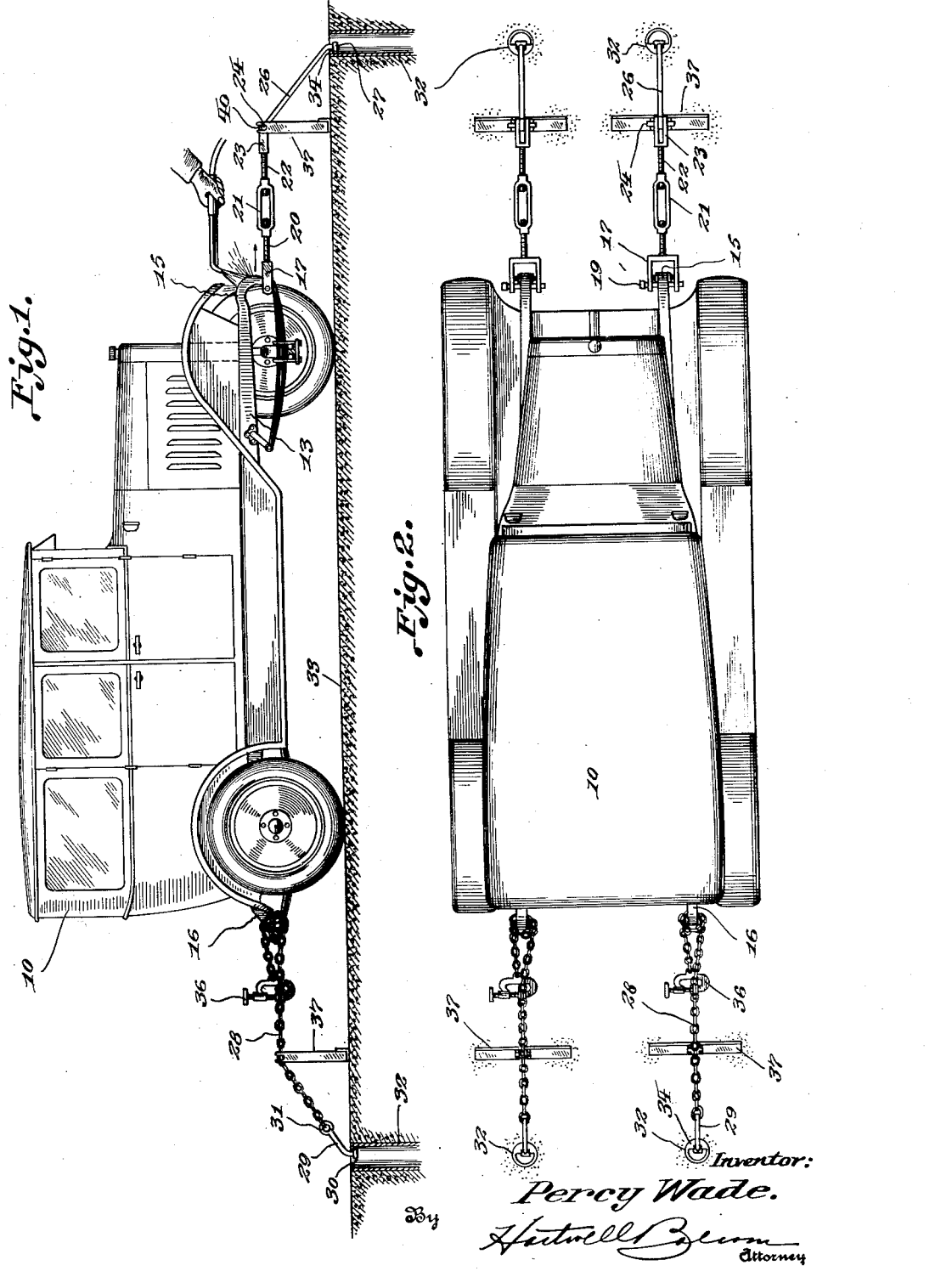
Inventor:
Percy Wade.
By Hartwell Brown
Attorney

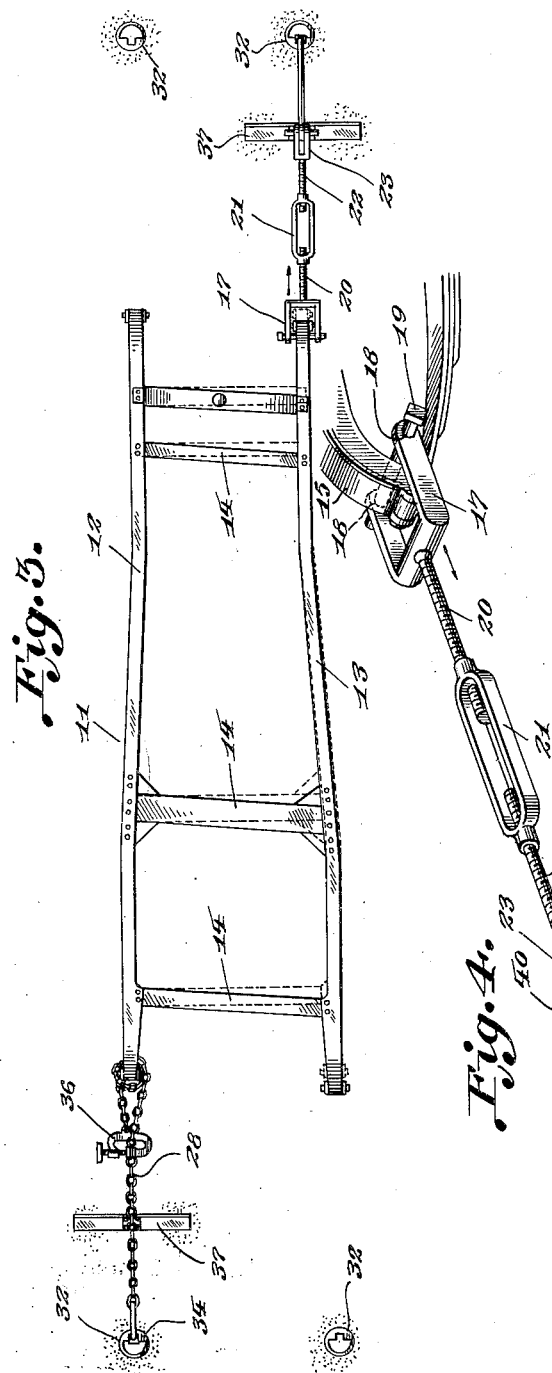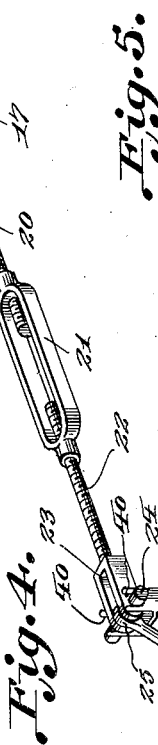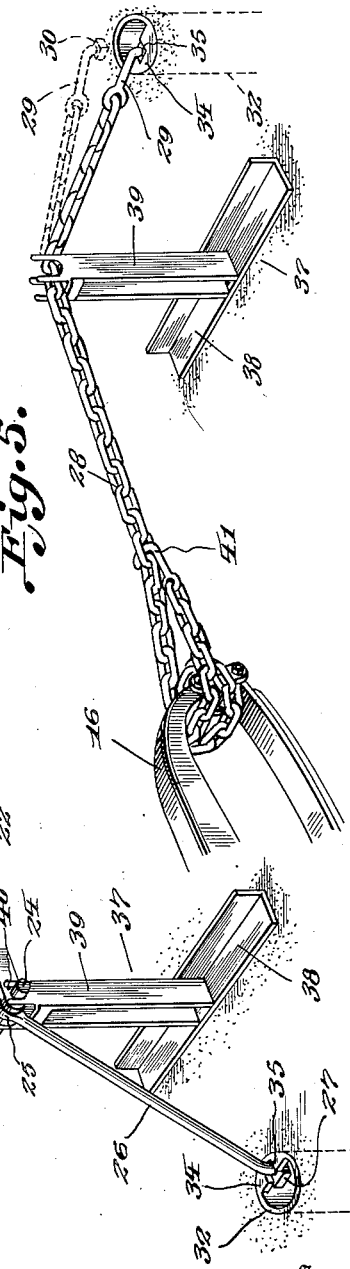

Patented Dec. 23, 1930

1,785,923

UNITED STATES PATENT OFFICE

PERCY WADE, OF WASHINGTON, DISTRICT OF COLUMBIA, ASSIGNOR TO THE WELDIT COMPANY, OF WASHINGTON, DISTRICT OF COLUMBIA

STRAIN-APPLYING DEVICE FOR METALLIC MATERIAL

Application filed November 1, 1929. Serial No. 404,158.

This invention relates generally to strain-applying devices, and the improvements are directed to novel and unique means whereby bent, distorted or deformed parts of an automobile chassis, such as the frame, horns or axles, may be returned to their ordinary position, either with or without the application of heat.

As will presently appear the primary object of the invention resides in the provision of means whereby the usual and present day methods, which are exceedingly tedious and laborious, may be dispensed with, to the end that a more satisfactory result may be secured and in a much more facile manner.

Those skilled in the art to which this invention appertains are probably aware that in returning a bent or distorted horn of an automobile frame to its ordinary position, it is customary to apply heat to the deformed part and by the aid of a tool, such as a monkey-wrench or hammer, said part is gradually re-shaped and after experimental measuring and the consumption of much time, the part is finally brought back to its true position. Also in the straightening of automobile frames and axles it is the practice to apply heat, then apply force, either by hammering or pulling, and after repeated applications of both heat and force the part or parts are returned to shape. These methods are exceedingly tedious, and hence it is the object of the present invention to apply heat to a deformed part and simultaneously therewith exert a pull or strain thereon until the part has been returned to proper position. Thus repeated heatings, due to ad interim chillings of the metal, in the old methods, are dispensed with.

Another object of the invention is to provide means whereby the automobile may be firmly anchored or affixed in a certain position to satisfactorily preclude movement thereof when a strain is being exerted on a deformed part.

Still another object resides in the provision of means whereby the direction or point of application of the strain, and also the point of resistance to said strain, may be positioned substantially parallel to the horizontal plane of a frame to preclude the elevation of the machine or a twist in the frame itself.

It is the further aim of the invention to provide more or less permanent mooring or anchoring means, adapted to be embedded in a concrete floor, or the like, at points to permit the shifting of the device from one side to the other of an automobile.

A still further object is to provide an assemblage of parts, simple in construction, yet amply sturdy to perform the aforesaid operations.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is an elevation of a motor vehicle, with the right front wheel removed and illustrating the operation attending the re-forming of a front horn adjacent said wheel, and further depicting the method of anchoring the devices in mooring arrangements positioned at pre-determined points in a concrete floor, or the like.

Fig. 2 is a plan view of a motor vehicle and showing that the devices may be applied to either side of the frame as desired.

Fig. 3 is a plan view of an automobile frame, the body being removed for the sake of clearness, and illustrating the diagonal pull exerted during the straightening of a twisted frame.

Fig. 4 is a perspective view of the device applied to one end of an automobile frame; and Fig. 5 is a similar view of that portion of said device adapted to resist the applied strain and to prevent twisting or other movement of the automobile during the several operations.

Referring now more in detail to the accompanying drawings, wherein like characters of reference denote similar parts throughout the several views, let 10 represent the body of an automobile, supported on a frame 11, the latter comprising the usual side members 12 and 13 and bracing members 14. As clearly shown in Figs. 1 and 2 the extremities of each of said side members are deflected downwardly to provide front and rear horns 15 and 16, respectively, to receive one end of the front and rear springs, suitably supported on the front and rear axles. The above structure represents an assemblage common to automobile construction.

As previously pointed out the device is adapted to re-form bent horns, and straighten twisted or otherwise distorted automobile frames and axles, and in order that the invention may be clearly understood these operations will be taken up in sequence, subsequent to a detailed description of said device.

As clearly shown in Fig. 4 of the drawings, the device comprises a clevis member 17, presenting apertured legs, as indicated at 18, the apertures being aligned for the reception of a bolt or pin 19, whereby the said member 17 is attached to the frame adjacent the juncture of the selected horn portion and the spring, as indicated. Said clevis member 17 is provided with a shank portion 20 and adapted to be threadedly engaged by a turnbuckle 21, the other end of the latter threadedly receiving the threaded shank 22 borne by the bifurcated member 23. The extremities of the leg portions of said bifurcated member 23 are provided with aligned apertures for the reception of a pin 24, which also passes through an eye-portion 25 of rod 26, the other end of said rod being provided with an abutment 27. It will be understood that said shank portions 22 and 20 are oppositely threaded so that the operation of said turnbuckle 21 secures the necessary movement, as will presently appear.

The means for resisting the pull exerted by the device just described, is clearly shown in Figs. 1 to 3 inclusive, and comprises a flexible element 28, such as a chain, or the like, and a member 29, the latter also presenting an abutment 30 at one end and an eye 31 at the other for attachment to said flexible element 28.

The mooring or anchoring means, hereinbefore referred to, comprises a tubular member 32, which is adapted to be embedded in a concrete floor 33, or the like, the top of said member 32 being provided with a flange 34 presenting a notch 35 adapted to receive one end of the rod 26 or the member 29, as shown in Figs. 1 and 4. Said flanges 34 are arranged flush with the top of the floor 33 and the tubular members themselves are arranged in suitable spaced relation to accommodate the operations on the varying sizes of automobiles. As shown in Fig. 2, two of said tubular members will be embedded in advance of the front wheels of the machine, while a like number will be positioned rearwardly of the rear wheels of the machine, the spacing or the width between said members conforming closely to the width of the frame.

Figure 1 of the drawings indicates the positions of the several parts during the re-forming of a horn which has experienced a blow and taken the distorted shape indicated. In arranging the parts, the member 29 is inserted in a notch 35 and the flexible element 28 wrapped around a rear horn 16, the end of said element being firmly secured by means of a clamp 36. The horn 15 is now engaged by the clevis member 17 by inserting the pin 19 in the apertures 18, as shown in Fig. 4 and the rod 26, previously connected to the bifurcated member by means of pin 24, is inserted in a notch 35. As previously pointed out, it is essential that the devices be positioned in an elevated position so that the pull will be exerted in a plane substantially parallel to the horizontal plane of the frame, and hence it is proposed to provide certain supporting means 37 adapted for variable positioning on the floor 33.

Said supporting means 37 comprises a lower horizontal member 38 and an upstanding element 39, suitably secured thereto, the upper end portion of the latter presenting oppositely disposed notches 40 for the reception of pin 24, as shown in Fig. 4. From the foregoing it is apparent that with the supporting means 37 arranged as shown in Fig. 1, those portions of the device adjacent the horns 15 and 16 are disposed substantially parallel with the horizontal plane of the frame, and in view of the abutments 27 and 30 and the notches 35 of said tubular members 32, the operation of said turnbuckle, prior to the actual re-forming operation, firmly connects the respective parts to respective anchoring means. The assemblage being now completed it is only necessary to apply heat to the deformed horn 15 and after a suitable interval of time, said turnbuckle 21 is manipulated to exert the necessary strain on the heated horn, said heating of the horn and operation of the turnbuckle being simultaneously continued until said horn has been returned to its proper position. These operations may be performed by one man and completely finished within a relatively short time. In the event the rear horn 16 is to be re-formed it is only necessary to reverse the position of the automobile, or should it be necessary to operate on the opposite forward horn, the devices may be shifted to the positions indicated in Fig. 2. The provision of four anchoring means materially reduces the shifting of the automobile. It will, of course, be understood that in the operation just described, it is unnecessary to remove the body 10 or any other part of the automobile.

In the case of a bent axle, the clevis member 17 is suitably secured thereto, the parts adjusted and upon the application of heat and the exerting of a strain by manipulating the turnbuckle 21, the axle is expeditiously returned to proper position. Thus repeated heatings and the resort to hammers or monkey-wrenches is obviated.

In correcting a twisted frame, as shown in Fig. 3, the devices are positioned to exert a diagonal pull on said frame and ordinarily the turning of the turnbuckle by means of a rod or the like, effects the proper re-forming without resort to heat, but if desired a blow-torch, or the like, may be applied to braces 14 and parts of the frame to assure an accurate and quick readjustment.

As shown in Fig. 5 of the drawings, one end of the chain 28 may be provided with a hook 41 for insertion in a convenient link and thus the clamping means shown in Fig. 5 is dispensed with. In said Fig. 5, the dotted lines indicates the member 29 prior to its insertion in a notch 35.

In Fig. 3 the body and other parts of an automobile are shown detached from the frame, but it is to be understood that the aforesaid frame-straightening operation is performed with the several component parts of said automobile intact.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A device of the character described comprising a clevis member adapted to be removably secured to a distorted portion of the frame of an automobile, means for restraining the movement of the automobile, means for anchoring said member, a member interposed between said clevis member and said anchoring means and connected to the latter, means connecting said clevis member and the interposed member whereby a strain may be applied to said distorted portion and means adapted to position the last-named means whereby the strain is exerted in a plane parallel to the horizontal plane of said frame.

2. A device of the character described comprising a clevis member adapted to be removably secured to the frame of an automobile, shiftable means whereby the movement of said automobile may be restrained, a rod having an abutment, means cooperating with said abutment to anchor said rod, a bifurcated member attached to said rod, means connecting said clevis member and said bifurcated member whereby a continuous strain may be exerted on said frame during the application of heat and supporting means adapted to position said clevis member and said bifurcated member in a position whereby the exerted strain is applied in a plane parallel with the horizontal plane of said frame.

3. A device of the character described comprising a clevis member adapted to be removably secured to the frame of an automobile, said clevis member having a threaded shank, movable means whereby the movement of said automobile may be restrained, a rod having an abutment, means cooperating with said abutment to anchor said rod, a bifurcated member attached to said rod and presenting a threaded shank, a turn-buckle operatively engaging the shank portions of said clevis and bifurcated members and adapted to be operated to exert a continuous strain on said frame and supporting means for said bifurcated member whereby the strain on said frame is exerted in a plane parallel to the horizontal plane of the frame.

In testimony whereof I affix my signature.

PERCY WADE.